United States Patent [19]

Hoover

[11] Patent Number: 4,498,749

[45] Date of Patent: Feb. 12, 1985

[54] FOLDED OPTICAL LARGE FORMAT PHOTOMICROGRAPHIC CAMERA SYSTEM

[76] Inventor: Richard B. Hoover, 7706 Teal Dr., SW., Huntsville, Ala. 35802

[21] Appl. No.: 481,455

[22] Filed: Apr. 1, 1983

[51] Int. Cl.³ .............................................. G03B 17/48
[52] U.S. Cl. ........................................ 354/79; 355/66; 355/71
[58] Field of Search ...................... 354/79; 355/67, 68, 355/69, 71, 43, 60, 64, 65, 66; 352/131

[56] References Cited

U.S. PATENT DOCUMENTS

| | | | |
|---|---|---|---|
| 1,161,556 | 11/1915 | Watkins | 354/79 |
| 2,077,809 | 4/1937 | Riepert | 354/79 |
| 2,351,753 | 6/1944 | Flint et al. | 354/79 |
| 2,651,969 | 9/1953 | Thor | 354/79 |
| 3,623,807 | 11/1971 | Gabler et al. | 354/79 |
| 3,820,882 | 6/1974 | Jakubowski | 352/131 |

*Primary Examiner*—A. A. Mathews
*Attorney, Agent, or Firm*—George J. Porter

[57] ABSTRACT

A photomicrographic camera system is provided in which a mirror (26) is utilized to deflect the light beam emanating from the eyepiece (20) of a properly illuminated, compound optical microscope (10) horizontally outward to another mirror (30) which then deflects the beam vertically downward to a film holder (36) containing a sensitized photographic film or paper material. An appropriate housing (24, 28, 32) confines the optical path and protects the film from stray light, while at the same time providing structural support for the mirrors (26, 60, 30) and auxiliary photographic components, such as baffles (57), shutter (48), filters (46), polarizers (52) and analyzers, light meter (69), etc. The film or paper holder (36) lies flat, and is supported by the same base that is used to support the microscope. Because the projection distance is quite long for such a compact device, very large format images (e.g. 20″×24″) or larger can be achieved easily with a system sitting on top a standard desk in a room of conventional 8 foot ceiling height. Provisions are made by means of the appropriate eyepiece spacer (18) or contoured positive lens (72) (for short systems) to insure that optimum resolution is achieved in the finished photomicrograph. By reversing the optical path through the system, high resolution microphotographs, microdots, or images for microelectronic component fabrication can be obtained utilizing the same structure.

36 Claims, 7 Drawing Figures

FOLDED OPTICAL LARGE FORMAT PHOTOMICROGRAPHIC CAMERA SYSTEM

FIELD OF THE INVENTION

This invention relates to photomicrographic camera systems, and more particularly is concerned with camera systems capable of producing direct first generation photomicrographic images of very large format on photographic film and paper materials. Specifically, it relates to a photomicrographic camera system employing a folded optical system which allows direct images of high resolution from a wide variety of conventional optical microscopes to be recorded on a large variety of different sensitive media over a large range of format sizes.

BACKGROUND OF THE INVENTION

In U.S. Pat. No. 1,161,556 there is described a vertical photomicrographic camera system in which the image from the microscope is projected vertically upward to the photographic film which is located at the top of a telescoping, light tight box. This patent discloses structure connecting the microscope to the photographic plate holder with a bellows and holding the camera aloft by means of adjustable rod stands. Also disclosed is structure for housing this camera in a physician's desk. To operate this camera, the observer looks down on the top of the ground glass screen upon which the image from the microscope is projected, while he reaches down to adjust the focus control of the microscope. Because of this, the projection distance is essentially limited to the length of the human arm, and therefore film formats larger than 4"×5" could not be conveniently used with this device.

In U.S. Pat. No. 2,077,809 is described a camera mounted on a vertical stand and connected to a microscope by means of a bellows. This device physically resembles a reflex camera, but it is nonfunctional as described and illustrated. As described in the claims there is "a horizontal negative holder on said camera upon which the picture taken by the camera of the object under observation by the microscope is directly reflected to display same to an observer simultaneously with the developing of the picture in the camera." If the microscope image falls upon an opaque plate as claimed so that the observer can see it, then the image will not reach the film to expose it. As we are not told to remove the plate prior to exposure, and as there is no means shown for tilting it out of the beam or sliding it out of the camera, the camera will not function as described. This patent also describes a drawing apparatus which employs a mirror to reflect the light to a drawing plane, the beam of light being received from the tube of the microscope which has been "laterally swung" for the purpose of making drawings of the object. However, this tube is now at a sharp angle with respect to the microscope optical axis. Light received by the microscope objective will not enter this tube, unless special reflecting optics are included in the body of the microscope. Since no such optical elements are shown or described in this patent, it must be concluded that this aspect of the invention is also incapable of operating as described.

In U.S. Pat. No. 2,351,753, Flint et al. describe a vertical photomicrographic camera with a bellows connecting the microscope to the camera head. Height of the camera head is adjustable by means of rack and pinion method and a counterbalance system is provided to offset the weight of the camera. The camera head is provided with a pivotable mirror, which can reflect the image to a ground glass screen at the front to be used for focussing, and then pivoted out of the optical beam as the film is exposed. A hood is provided around the ground glass screen to cut down on the undesirable effects of overhead lighting during focussing. The concepts and methods set forht in this patent have dominated the field of large format photomicrography for the past four decades. These same methods are employed in the recently marketed Kenro MP 812 photomicrographic camera system. This is an 8"×10" camera system which is capable of providing images on the recently released 8"×10" Polaroid ® Print Film and Transparency material. This camera also consists of a large vertical stand which holds the camera head above the microscope. Focussing is accomplished by means of deviating the image to a large ground glass screen which is partially shielded from room lights by a hood. The camera head is connected to the microscope by means of a bellows system. This is indeed a large format photomicrographic camera system based upon the art and structure of the Flint et al. patent. Reflex cameras of slightly smaller format (e.g. 4"×5") have also been coupled to microscopes by means of solid, plastic or metal, conical tubes that serve both as the structural support for the camera, and also as the light tight bellows. Devices such as this are currently available as photomicrographic cameras for the Olympus ®, Nikon ®, and other microscope systems. These devices are also provided with reflex view focussing means. Other devices are available that allow a worker to connect a single lens reflex camera (such as a modern 35 mm camera) to the microscope. Some of these, such as the Nikon ® F adapter, were designed with the correct realization of the importance of a small, positive correcting lens when the microscope image must be focussed at a very short (4"-6") projection distance. Others are now marketed without a correcting lens, and the worker achieves focus by focussing the microscope, which results in the objective lens being significantly away from the position at which it was designed to operate. This results in degradation of the quality of the resultant picture. These adapters simply constitute light tight tubes that link the 35 mm camera to the microscope and support it above the microscope with the film plane centered on the optical axis of the microscope. Focussing is accomplished by looking in the camera reflex view port. In the case of the Nikon ® system, a specially configured ground glass screen may be mounted in the camera to facilitate focussing at low light levels as is encountered at high magnifications and in dark field photomicroscopy.

It is therefore an object of the present invention to provide a new and improved method and means of producing large format photomicrographs from conventional optical microscopes.

SUMMARY OF THE INVENTION

According to the present invention large format photomicrographs may be produced by means of a camera employing a folded optical system that allows the beam from the microscope to travel first vertically upward to a flat mirror. This mirror deflects it horizontally across to another mirror which deviates the beam vertically downward toward the film plane. The camera that is configured in this manner may be used with any conventional optical microscope which is illuminated with a high intensity light source used in accordance with the proper teachings of microscopy (e.g. Koehler illumination, critical illumination, Dark Field Illumination, Phase Contrast Illumination, etc.). The camera in the preferred embodiment of the present invention involves a structural housing of three components. There is a neck that provides optical and structural coupling with the microscope eyepiece and protrudes vertically upward, thus affording a light tight pathway through which the diverging beam from the microscope eyepiece propagates. This neck is connected to a horizontal arm which also provides a light tight path for propagation of the microscope beam, after it has been reflected in this direction by means of a mirror situated at the top of the neck and oriented at substantially a 45° angle with respect to the vertical. The arm is connected to a tall vertical box which houses a large mirror that deviates the expanding beam downward to the bottom of the box, upon which rests the easel of film plate holder which holds the photographic sensitive medium. In the neck are located necessary or desirable photographic accessories, such as the shutter, baffles, filter holder, and polarizer or polarizing analyzer. Provisions are made to allow covers to be slid into place over the mirrors to protect them from particulare contamination when the microscope camera is not in use. Focussing is accomplished by direct examination of the image as it falls upon a white focussing slide that lies immediately on top of the photographic film or paper and is removed just prior to exposure. A door in the front of the camera is provided to facilitate focussing the image and framing and composing the picture. Alteration of image size is controlled primarily by varying the microscope magnification at the microscope itself, i.e. altering the eyepiece and objective element combination. A properly machined spacer is inserted around each eyepiece to insure that the microscope objective is at the precise position at which it was designed to operate when optimum focus of the image is achieved on the photographic film. Since the projection distance is the sum of the distance from the eyepiece to the mirror vertically overhead, plus the length of the horizontal arm, plus the vertical downward distance from the large mirror to the film plane at the base of the housing, very great projection distances can be achieved in a camera that can easily sit on top of a desk or a standard laboratory work table. With the film holder lying flat on the camera base it has no tendency to creep downward under its own weight or be unduly sensitive to vibrations. Gravity helps flatten out large sheets of film or paper, rather than trying to pull them out of their holder. Moreover, the large image displaced on the focus sheet immediately beside the microscope may be directly viewed without holding the head rigidly fixed, as is necessary when looking into an eyepiece. This freedom reduces strain and fatigue. Also, the worker can easily reach all controls to adjust focus, specimen position, etc. Direct viewing of the large image on the focus sheet by two or more persons at once also facilitates communication about specific features of the image, i.e. the worker can simply point to a particular feature rather than trying to describe the location of that feature in words so that a second person can see it in the microscope. The present invention also allows the worker to readily alter film format and framing. For example, prior to recording an image on a 20"×24" sheet of film, the photo-microscopist may desire to lay a 4"×5" film holder on the base to photograph a small piece of his large image, for an inexpensive measurement of focus, color balance, exposure time, etc. The present invention also allows the photomicroscopist to record images on small format systems, such as video cameras and 35 mm cameras. When utilized in an appropriate manner, the present invention can also be employed in the production of microscopic images such as is desired for the fabrication of graticles, microdots, and images which may be useful in the construction of microcircuit components.

BRIEF DESCRIPTION OF THE DRAWINGS

A presently preferred embodiment of the invention will now be described in detail in connection with the accompanying drawings, wherein.

DETAILED DESCRIPTION OF THE INVENTION

Figure 1:
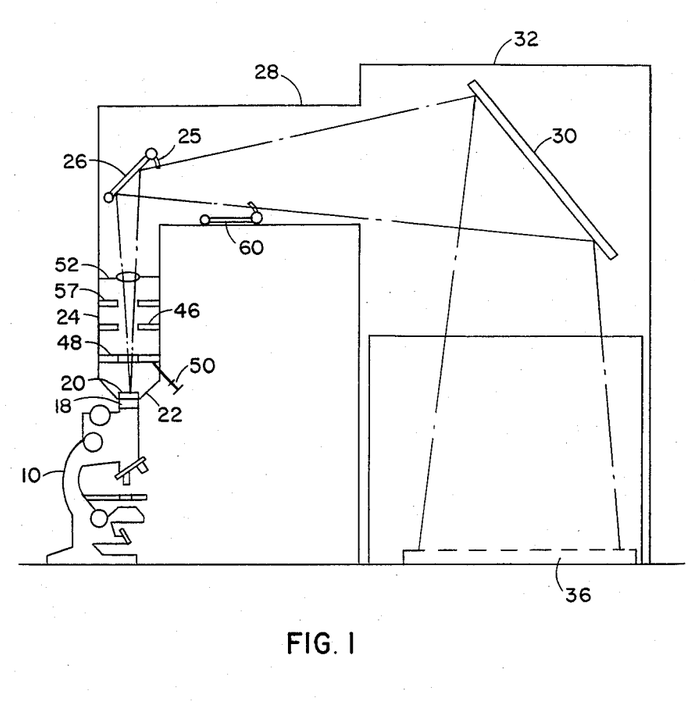
FIG. 1 is a diagramatic view of one embodiment of the invention.
Figure 3:
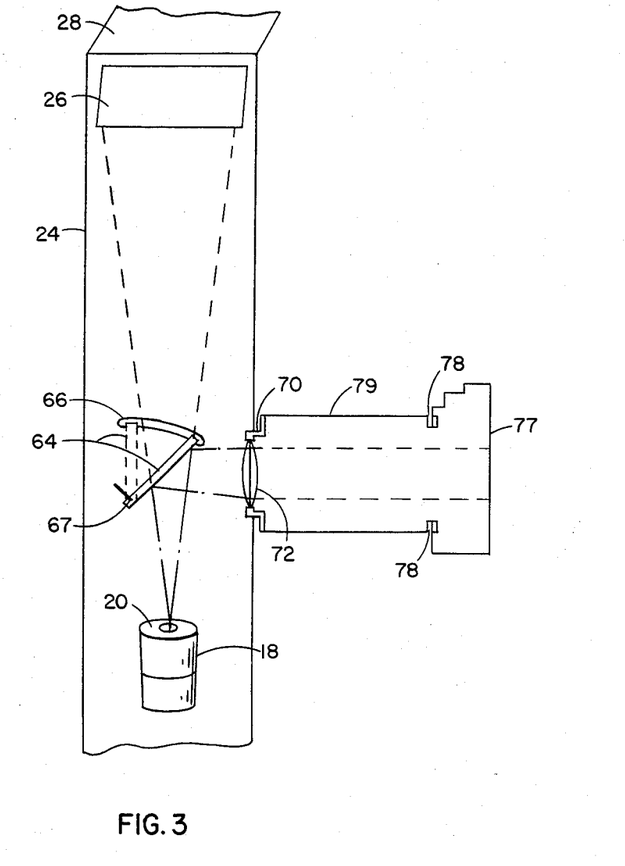
FIG. 3 is a diagram illustrating a portion of the present invention when it is used in conjunction with a small format device, such as a 35 mm camera or video camera.

As may be seen in FIG. 1, the camera housing 32 is a large box two to four feet high with an arm section 28 projecting out from the side of the box. A neck section 24 projects downward to cover the eyepiece 20 of the microscope 10. A rubber sleeve 22 may be used to make a light tight connection to the microscope 10. The optical section comprises an eyepiece spacer 18 (to correct for short projection distance, since the microscope is focused at infinity), a primary mirror 26, and a secondary mirror 30. If desired a tertiary mirror 60 is placed between the primary and secondary mirrors. The tertiary mirror 60 is used to get the proper and correct orientation on standard photo paper and film. If a mirror image is satisfactory, or if Polaroid ® film is being used, then the tertiary mirror folds back out of the way and is not used. Several additional optical components which may be included with the system are a shutter 48, a baffle system 57, a rotating polarizer 52, filter and holder 46, and film holder 36. The device may be equipped with an attachment for small format still, motion picture, or video cameras (FIG. 3).

Figure 2:
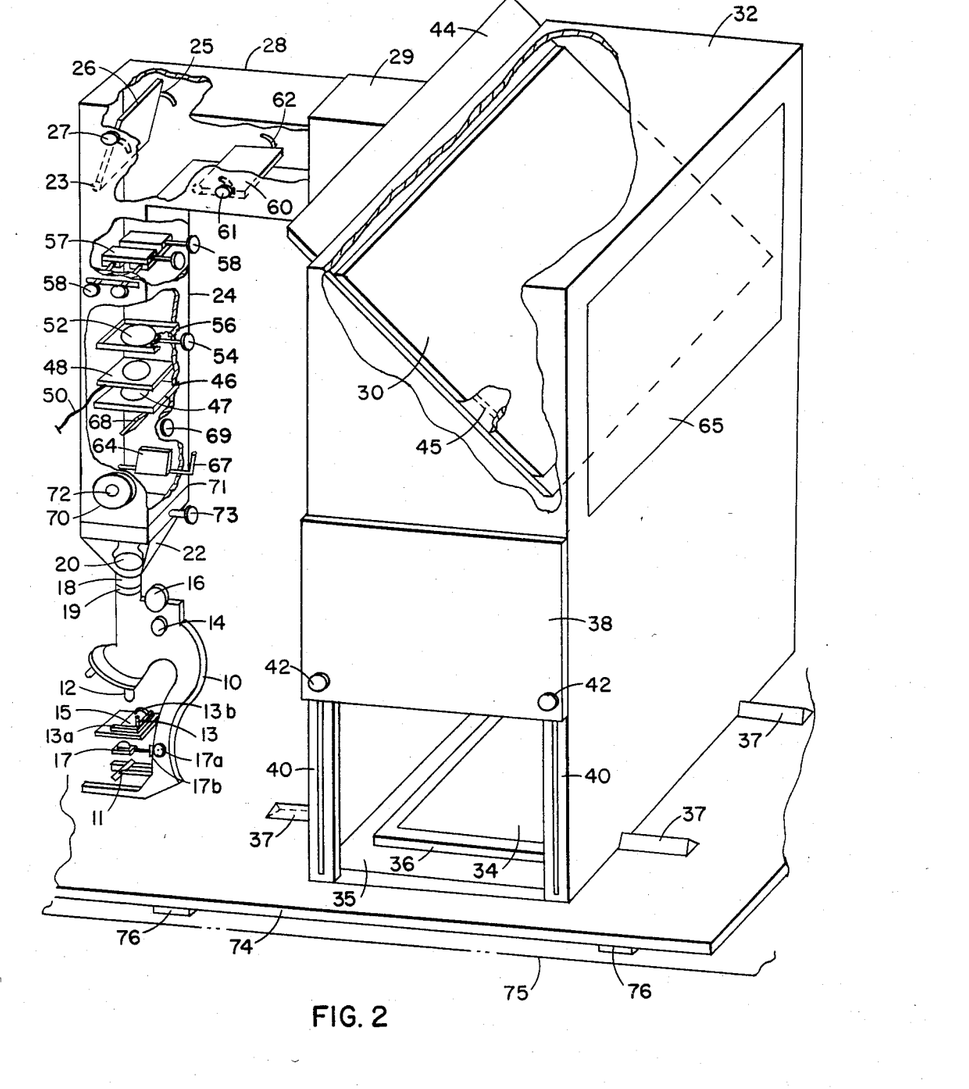
FIG. 2 is a perspective view of one embodiment of the invention, showing the interior parts.

Referring now to FIG. 2, reference numeral 10 designates a standard, compound optical microscope with mirror 11 and substage condenser 17. The specimen is on microscope slide 15 with a mechanical stage 13a capable of moving the slide by adjustment of the XY controls 13. The specimen is illuminated by proper methods in accordance with the teachings of good microscopic technique (e.g. Koehler illumination, Critical illumination, etc.). When the specimen is properly focussed by means of the coarse focus 16 and the fine focus 14, the light entering objective 12 is focussed to the appropriate focal point of eyepiece 20. The image of the specimen is then refocussed by eyepiece 20 to a point at infinity, because modern compound microscopes are designed such that the optical system is properly corrected for infinity focus, since this has long been known to result in the least eye strain upon the observer. However, in the present invention, we desire to sharply focus this image upon a film plane that is not at infinity, but rather is situated at a distance of several feet from the eyepiece. For this reason, a spacer 18 is provided for each eyepiece. The precise thickness of this spacer is determined by the magnification of the eyepiece and the distance of the projection required to properly record the image of the size dictated by the film size that has been selected. For any given eyepiece and projection distance combination, the exact spacer width required can be determined experimentally, by first focussing the specimen sharply while looking through the eyepiece with the unaided eye, and then putting the microscope into the camera apparatus and focussing the image upon the film plane by simply extending the draw tube 19. The distance that the draw tube had to be extended to achieve sharp focus is the correct width for spacer 18, when that particular eyepiece and objective system is used at that projection distance. Failure to use the spacer will means that the objective must be de-focussed to achieve a sharp image on the film plane. For short projection distances (less than 1 foot) this is critical and image degradation that is noticeable will result. Fortunately, the effect becomes less severe for the long projection distances that are important for large format photomicrography, and the spacer can be eliminated in making large images, except for the most critical and demanding work, where the highest resolution obtainable is of the utmost importance. The image from eyepiece 20 then propagates vertically upward in the light tight camera neck 24. A light tight seal 22, which may be made of overlapping spirals of black rubber or other suitable material optically isolates the eyepiece and prevents stray light from entering the camera, and couples the eyepiece 20 to the camera neck 24 and insures that the microscope is essentially centered on neck 24 and therefore is situated essentially on the optical axis of the camera. The spiral rubber seal 22 may be easily parted to facilitate interchange of eyepiece 20 and spacer 18, which allows magnification adjustment to be accomplished without changing the objective 12 being used and without altering the length of the horizontal arm 28. The beam which exits the eyepiece then propagates vertically upward in camera neck 24 until it reaches mirror 26 that is oriented at a nominal 45° angle with respect to the neck. For certain reasons that shall be described later, it is desirable that this mirror be moveable between two fixed positions, and this is accomplished by mounting the mirror on a pivot 23 and rotating it between the top and bottom positions of the curved slot 25. The mirror is locked into each desired position by means of the lock screw 27. With this primary mirror in its uppermost position, and with the tertiary mirror 60 lying flat and out of the optical path, the optical beam is deflected horizontally toward secondary mirror 30 and it propagates along the light tight arm 28. When the diverging beam reaches the large mirror 30, which is nominally oriented at a 45° angle with respect to the vertical, it is deflected vertically downward toward the base 35 of camera housing main body 32. Resting on the base of camera housing 32 there is a photographic film holder 36 equipped with a dark slide and focus sheet 34. Camera housing 32 may be equipped with a sliding opaque door 38, that can travel up and down in rails 40 and be held in place when in the elevated position by means of lock screws 42. In this embodiment, the photomicroscopist is able to move the film plate holder (or photographic paper easel) 36 around in the projected image so as to frame and crop the picture as he wishes, in much the same manner that the darkroom technician works with the photographic enlarger. The dark slide and focus sheet 34 is painted black on the downward surface and white on the top, and the corners and center of this focus sheet are appropriately marked to aid the photomicroscopist in achieving the best possible large format photomicrograph. In this embodiment, when the door 38 is raised, the operator may insert his head through the door to closely examine the image as it is projected on the focus sheet 34. Simultaneously he may adjust the microscope mechanical stage controls 13 and the coarse focus 16 or the fine focus 14. Since these adjustments are made while viewing the direct projected image on a focus sheet that lies in the same plane the film or paper will occupy when the focus sheet is removed, extremely critical focus may be achieved. Also, it should be mentioned that, in this embodiment, a small format film holder, such as a 4"×5" Polaroid ® film holder, may be inserted in place of the large film holder 36. This allows a sample of the image to be photographed before the large expensive piece of color paper or film is exposed. This ability to do exact small format test exposures of a small piece of the large format beam should result in considerable savings of cost, as very large format color film is quite expensive. Other embodiments may also be constructed in which the camera is entirely sealed, with the film holder rigidly mounted in the camera base with film and focus sheet access through a slot in the side of housing 32 and a view port (not shown) provided in the side of housing 32 could be provided to replace door 38. By properly canting mirror 30, excellent images will still be projected on the white face of focus sheet 34, with the rear of film holder 36 elevated to allow comfortable viewing of the image by a worker sitting in front of the camera. This is of value for in-process high resolution monitoring of microelectronic components. Whenever desired, high quality large format pictures of the microcircuit can be taken by simply removing the focus sheet and activating the shutter. Since the worker is looking at a large image projected on the focus sheet, it is not necessary to hold the head rigidly above a microscope eyepiece, thereby reducing eye strain, neck strain, and muscle fatigue as experienced now by microcircuit workers.

In the preferred embodiment there are also certain desirable features built into the camera neck 24. These include a small format camera/video camera adapter. Referring now to FIG. 3, we see a camera adapter tube 79 with bayonet mount 78 and camera 77. This tube 79 is mounted on the port for camera adapter 70. This adapter 70 is of the bayonet mount configuration, and couples to a tube structure 79 that accepts either a standard 35 mm camera, video camera, $2\frac{1}{4} \times 3\frac{1}{4}$ camera, or small format movie camera. The adapter port 70 is equipped with a small positive doublet correcting lens 72 that is precisely contoured to correct for the short projection distance required by the small format devices that will be employed at this port. This adapter port is normally covered by an appropriate opaque cover (not shown) when it is not in use. To use the small camera port 70 with correcting lens 72 the desired small format photographic camera or video camera is affixed to the port by means of the adapter tube 79 bayonet mount 78. The small mirror 64 is flipped into position by means of lever 67 and it stops at the furthermost position allowed by curved groove 66. Mirror 64 then intercepts the primary beam emanating from eyepiece 20 and reflects it horizontally outward to correcting lens 72 in port 70. Shuttering is accomplished either by means of the built in focal plane shutters included in small format cameras or it is accomplished electronically in the video camera system. In order to use the camera for large format photomicroscopy, lever 67 is moved to a position that removes mirror (or prism) 64 from the optical beam.

With mirror (or prism) 64 removed, the beam propagates vertically upward. It passes through a hole in filter drawer 46, which may be slid out of the neck 24 to be loaded with neutral density filters, color correcting filters, etc. If no filtration is desired, drawer 46 is simply left empty. The beam then propagates to shutter 48, which in the preferred embodiment is a conventional iris diaphram type shutter, of which many types are now commercially available. It should be pointed out that in the simplest embodiment, the shutter 48 is simply a sheet of opaque plastic or cardboard that can be slid in and out of the optical beam. In more sophisticated embodiments the shutter 48 used may be a more complex electro-optical device. However, when a simple iris diaphram type shutter is used, it may be activated by a device such as the traditional shutter cable release device 50 ilustrated in FIG. 2. Above the shutter 48 is a removeable drawer 56 that contains a polarizer 52. When the drawer is slid to the fully "out" position it is still held by the camera neck 24 but the polarizer 52 is out of the optical beam. When polarization studies are desirable the drawer 56 is slid closed such that the polarizing element 52 is in the optical beam. Of course, for this to be meaningful in accordance with the teachings of modern microscopy, it must be used to analyze the beam of polarized radiation emanating from the specimen held on slide 13. This is accomplished by mounting a polarizing screen below slide 13 and above condenser 17. To properly analyze the polarized beam emanating from the microscope, provisions must be made to rotate the polarizing element 52. In the preferred embodiment this is accomplished by means of a rotary knob 54 that turns a gear that engages a toothed wheel at the base of the holder for the polarizer 52. In this manner, by simply turning knob 54, detailed analysis of the degree of rotation of the polarization axis of the light that enters the specimen on slide 15 can be realized.

Also in neck 24 is a sliding baffle system 57, which can be controlled by means of handles 58 that are external to the neck. These baffles can be used to eliminate any extraneous and unwanted radiation from reaching the film plane in holder 36. Since most photographic formats utilized today are rectangular, these baffles are movable straight edges, constructed of an opaque plastic or metal material painted flat black. Indeed, to minimize unwanted reflection, the interior of camera neck 24, horizontal arm 28, and camera housing 32 are all painted flat black, although the exterior may be of any color or nature desired. In the preferred embodiment, the structural elements of the camera, comprising the neck 24, arm 28, and housing 32, are constructed of solid opaque plastic, sheet metal, or other suitable fabrication material. The housing 32 must be sufficiently massive and strong to support the weight of the counterbalanced (although smaller) arm and neck along with the required optical elements and desirable photographic components that are housed in the neck, which may even include a beam splitter 68 which deviates a portion of the beam to exposure meter 69.

At the top of the neck 24 is mounted a flat mirror 26, which deviates the vertically ascending beam into a horizontal path along the arm 28. Mirror 26 is pivotable in the preferred embodiment, as is mirror 60. When mirror 26 is in its uppermost position and mirror 60 is lying flat against the horizontal base of arm 28, the beam reflected by mirror 26 is deviated into a horizontal path. It propagates directly to mirror 30, which may be protected from dust and particulates when not in use by a sliding dust cover 44. Since both mirrors 26 and 30 are situated at a nominal angle of 45° with respect to the vertical, the beam which strikes mirror 30 is deflected vertically downward by mirror 30 toward the film plane 36 beneath focus sheet 34. If this image is recorded on black and white film, or reversing media such as is now used in the Polaroid ® Polacolor ER 8×10 Land Film Type 809, a proper left/right orientation will be realized in the finished photomicrograph. For most work, such as photomicroscopy of mineral and chemical specimens and most biological specimens, the finished orientation is of no great importance. In other areas, such as photomicroscopy of electronic microcircuitry components, the orientation of the image can be of great importance. If orientation is not important to the photomicroscopist, the preferred embodiment is one in which mirror 26 is rigidly mounted at a 45° angle with respect to the vertical and mirror 60 is not included in the camera at all. Operation of this system involves deviation of the beam from the eyepiece onto a horizontal path by mirror 26 until it is intercepted by mirror 30. The beam is then reflected vertically downward until it strikes the film in holder 36 to record a sharply focussed large format image.

Figure 4:
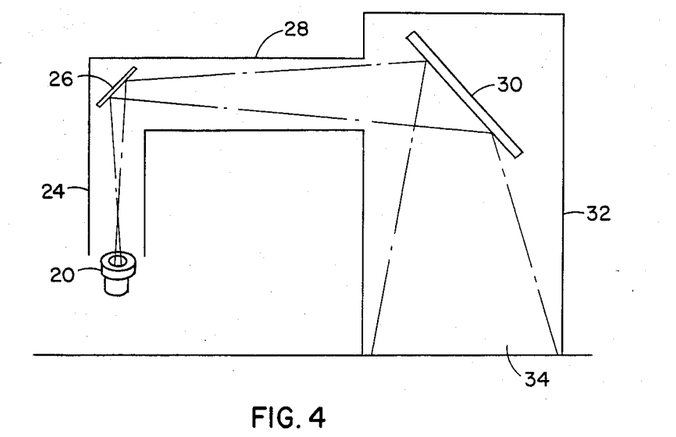
FIG. 4 is a diagram showing the path of light rays in a simple embodiment of the camera employing only 2 mirrors.
Figure 5:
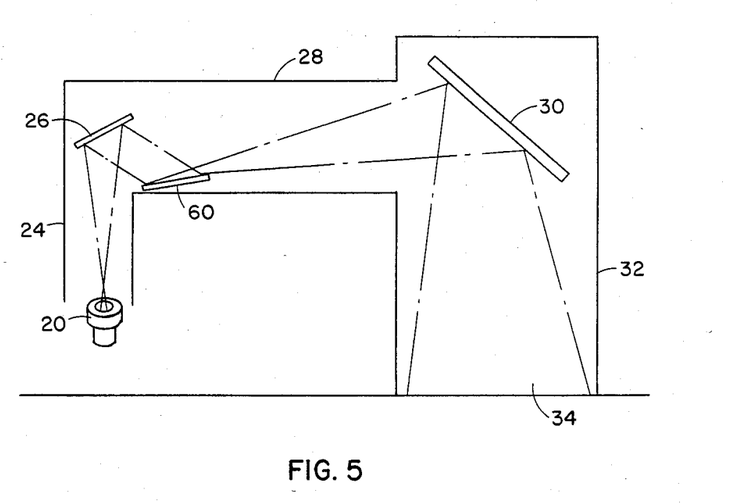
FIG. 5 shows the ray path in the camera when the additional mirror is used to correct right to left orientation of the image, with mirrors 26 and 60 pivoted to proper positions for use in this mode of operation.

If left to right orientation is important and it is desired to record the image on standard black and white or color paper, then it is necessary to use reversing mirror 60 to correct for the number of reflections employed. It is to be noted that an odd number of mirror reflections will give a proper image when viewed directly on the focus sheet or recorded on normal paper, whereas an even number of reflections will give a properly oriented image on reversing media such as that used in the Polaroid ® film. Hence, in order to obtain a properly oriented image with a standard photographic easel at film holder 36, holding paper such as Ektachrome ® RC or Cibachrome ® print material, mirror 60 is rotated into it proper functioning position by moving it counterclockwise until it reaches the end of slot 62. It is locked into place by means of lock screw 61. Mirror 26 is moved by rotating it as far clockwise as is allowed by curved slot 25 and it is locked into position by means of lock screw 27. In this configuration reversing of the optical path occurs, as is illustrated in FIG. 5. The simpler two mirror embodiment is illustrated in FIG. 4. It should be pointed out that correct orientation of the image for nonreversing materials can also be achieved by only one reflection as well as by three. Hence an alternate embodiment is envisioned in which the large mirror 30 is removeable (or pivotable) and the image from mirror 26 is projected to the vertical wall of camera housing 32 that may contain an intermediate size (e.g. 8"×10" ground glass or translucent rear projection screen 65). Such an embodiment may have applications in classrooms and microelectronic plants, where it may be desirable to show a high quality image of a particular microscopic specimen or chip to one or more people simultaneously without taking the effort to photograph it. Direct images can easily be taken with a film holder slid into an appropriate mounting position on the interior vertical wall of housing 32 in the same place as was occupied by the ground glass or rear projection screen of the preceding discussion. Although this holder is not shown, the new 8"×10" device for the large format Polaroid ® sheet film functions well in this embodiment. It is also noted that the entire housing 32 may be mounted on grooved wheels (not shown) that sit on triangular ways 37. This will allow the housing to be adjusted horizontally, provided the camera arm 28 is appropriately configured such that it is capable of telescoping at junction 29. This allows the camera to be moved closer to or farther away from the microscope as is dictated by needs of convenience and the desire to have the ability to make minor adjustments in the resultant magnification without altering either the microscope objective or eyepiece being used. The entire camera and microscope may sit upon a solid common base 74, that is isolated from room vibrations by means of rubber pads 76 on support 75. It should also be mentioned that camera neck 24 may be vertically adjusted by telescoping it at junction 71 and locking it into place by means of lock screw 73. This adjustment allows for variations in height of the microscope 10 and also facilitates interchange of eyepiece 20 and spacer elements 18.

The camera structural components, neck 24, arm 28, and housing main body 32, are constructed out of a suitable opaque material that is both strong and lightweight, such as modern plastics, and/or sheet metal type materials. The primary optical components of the camera, mirrors 26, 30, and 60, are made out of flat glass suitably polished, silvered, and front surface coated with an appropriate overcoat such as $MgF_2$ or $SiO_2$ for protection. However, experience has shown that only slight imperfections can be perceived in the image as a result of ghosting from front surface reflections if the mirrors used are conventional rear surface ¼" float glass mirrors such as are already available. Therefore, it is considered acceptable in accordance with the aims and desires of this present invention that mirrors of this type may be utilized in this Folded Optical Large Format Camera System in a low cost configuration. Mirrors 26 and 30 are ideally trapezoidal, although they may be made oval, rectangular or any other shape as long as the full and complete diverging beam is intercepted by the mirror and reflected along the path wherein it ultimately falls upon the film plane in sharp focus.

Figure 6:
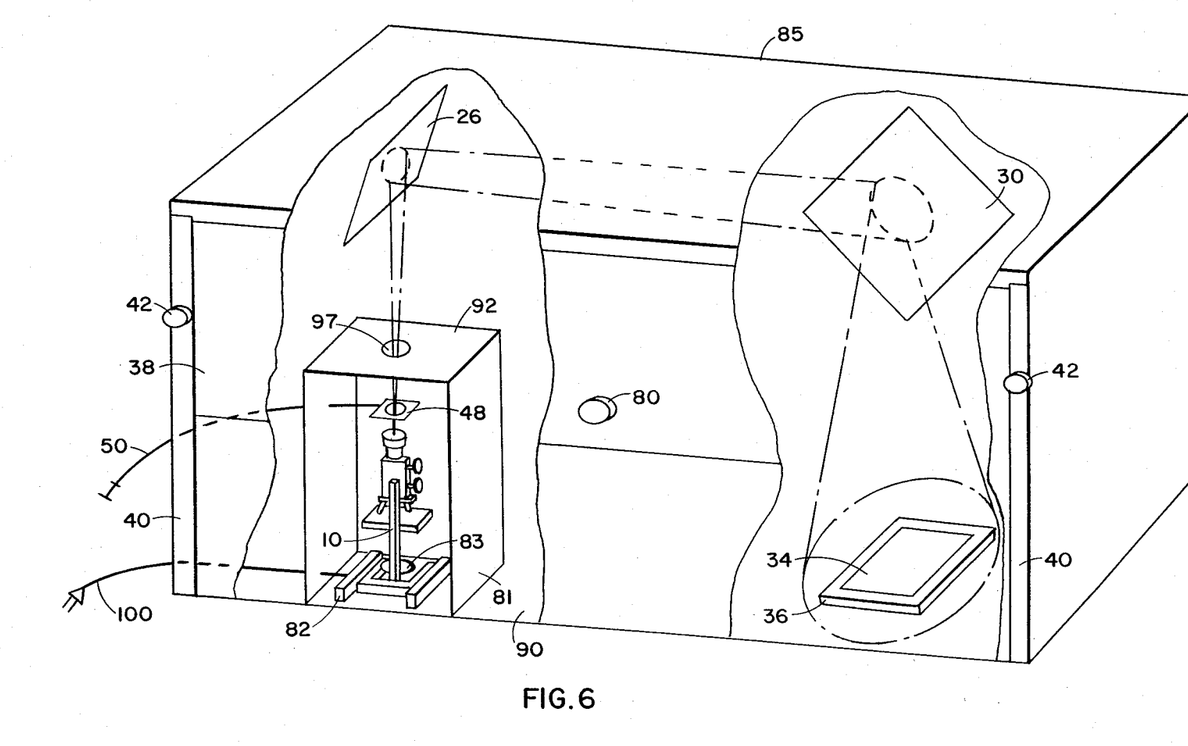
FIG. 6 shows an alternative embodiment of the invention which is completely enclosed in a modified housing.

The present camera system may also be embodied in other forms which still retain the spirit and concept of the invention. This includes, but is not limited to, techniques and methods such as the one illustrated in FIG. 6. In this embodiment, the microscope, folded optical system and photographic recording medium are all housed in a single structure, rather than employing a camera based upon the concepts of the main body housing, camera arm, and camera neck configuration as has been described. Referring now to FIG. 6, microscope 10 with illumination means 83 is sitting on the base of a large housing 85 that is constructed of opaque sheet metal, plastic, or other suitable construction material. Guide ways 82 of appropriate width to receive the base of the microscope enable the microscope to easily be positioned and repositioned in exactly the same place with respect to the base 90 of the housing. A baffle system 81 is erected around the microscope to prevent stray light emanating from source 83 from reaching either mirror 30 or film plane 34. The baffle 81 is constructed of suitable structural material to be opaque to visible light and to afford adequate mechanical support for any or all of the optical components which have been previously described as being housed in the neck of the camera in the preferred embodiment. Shown in FIG. 6 is only the shutter 48, connected to a long shutter cable release 50 which allows the shutter to be activated from outside housing 85. Baffle system 81 consists of three vertical panels joined at the seams and a top (with hole 97, through which the beam may pass) so as to form a box without a front panel. With sliding door 38 in the up position, the operator can make necessary changes of specimen, focus or lighting conditions as he desires to the microscope through the open front of baffle 81. When door 38 is closed by means of handle 80 the inner surface of door 38 forms the front panel of baffle 92. Baffle 92 now has the form of a completely enclosed box with a hole 97 in its top through which the light beam from microscope 10 propagates vertically upward toward mirror 26. This mirror is mounted to structural elements within the interior of housing 38. The light beam is then deflected horizontally outward to mirror 30 which then deviates it vertically downward to focus sheet 34. Sheet 34 covers the film in film holder 36 except during times of exposure. Door panel 38 may be closed by means of handle 80 during exposure of the image. The purpose and function of door panel 38 is of course to keep unwanted external radiation from fogging the film or degrading the picture. Panel 38 can be omitted if the camera is to be used in a darkened room. Also, any number of other reasonable methods may be employed to accomplish its intended purpose.

Figure 7:
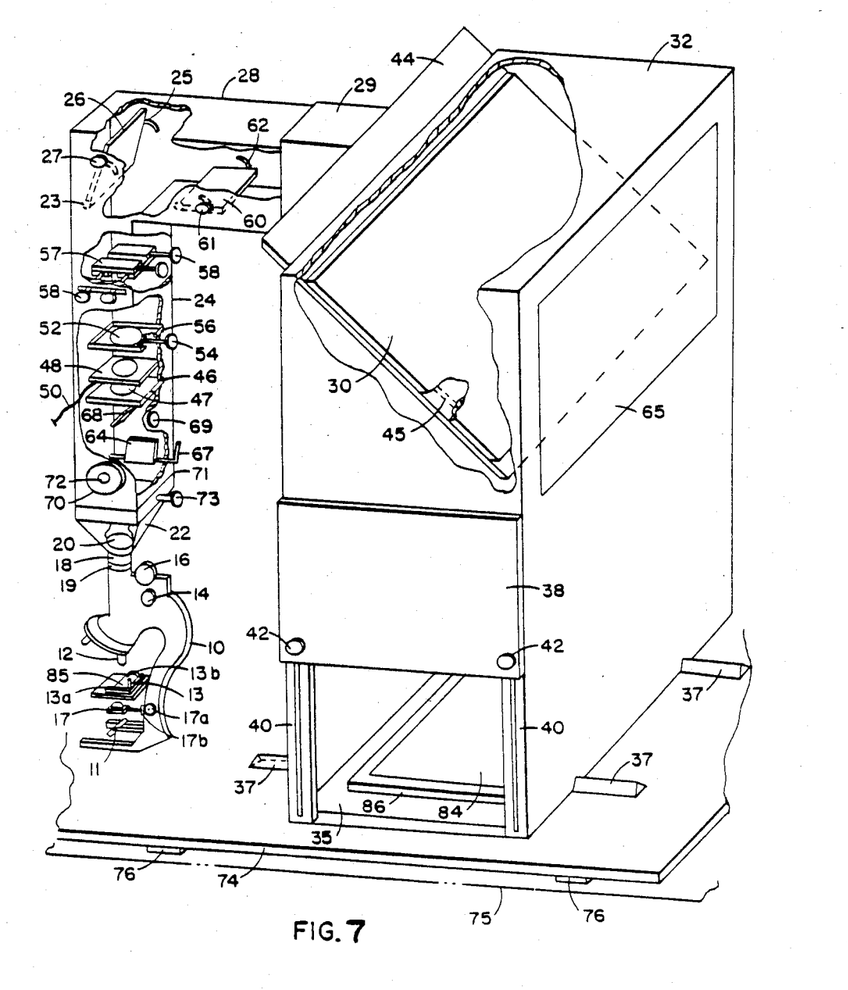

The Folded Optical Large Format Photomicrographic Camera System may be modified so that it may be used as a device for producing microphotographs, microdots, or microscopic images on photoresist material for the fabrication of microelectronic components. In this alternative embodiment, the optical path through the camera is totally reversed. Looking now at FIG. 7 the subject to be photographed (original copy) 84 is placed in the position normally occupied by the focus sheet 34 (FIG. 2) and uniformly illuminated by an extended internal light source 86. If the originals are in the form of transparencies or photographic negatives, good uniform illumination may be achieved by replacing film holder 36 with a light table 86, such an extended internal light source may be produced by mounting a sheet of ground glass or translucent plexiglass above fluorescent light tubes. The light from a diffusely illuminated transparency placed upon the top surface of such a light table will then travel upward in the main body housing until it is reflected by secondary mirror 30 toward primary mirror 26. Thence the beam is deflected downward to eyepiece 20 and thence to microscope objective 12 which focusses it to a sharp image in the focal plane of the objective 12. In this embodiment, instead of microscope slide 15 we utilize high resolution photographic plate 85 with its emulsion side upward. If no precautions are taken to protect the photographic plate (by means such as a baffle around the plate connecting it with the objective), the microphotographs should be recorded in a darkened room to prevent undesirable fogging of the plate 85. The objective is sharply focussed on the emulsion surface of the photographic plate and an image is recorded whenever the shutter 48 is activated. By moving the photographic plate by means of mechanical stage control 13, a great many microphotographs can be recorded on the same photographic plate 85. After normal photographic development, minute images on the plate 85 may be viewed by means of the camera used in its normal way. Full size hard copies may be obtained at any time by simply producing a large format photomicrograph utilizing the earlier-described embodiments of the invention. A microphotograph of a positive print may also be produced by placing the print on the camera base and providing uniform illumination from an external source. This can take the form of a beam projected through doorway 38, or by reflecting the light beam from beamsplitter 68, introduced through a port (not shown) in camera neck 24 opposite light meter 69. This light beam then travels upward to mirror 26 which then deviates the beam horizontally along camera arm 28 to secondary mirror 30 which deflects the light downward to illuminate the print held in the film holder or easel 36. This light reflected by the positive print travels backward through the optical train to form a microphotograph in the focal plane of objective 12 on the photographic plate 85 held by the mechanical stage.

It is also possible to replace the film holder 36 with a video monitor and produce a microphotograph of an image displayed on the monitor. Since the microscopic image can be recorded on any light sensitive medium placed in the focal plane of objective 12, this may take the form of photoresist materials such as are used in the production of microelectronic components.

Microphotographs can also be produced with a camera in the small format camera port 72. This is accomplished by mounting a transparency or negative in the film plane of the camera 77 and mounting a ground glass or translucent sheet of material behind the transparency. A flood light, flash, or other suitable light source is then used to produce the microphotograph when the shutter of the camera is activated. As described before, the photographic film, photographic plate, photoresist or other light sensitive medium is mounted with its emulsion side up in the focal plane of objective 12 for the particular system used.

As herein described, the present invention is a photomicrographic camera system which is simpler, less expensive to manufacture, easier to adjust, and which provides greater mechanical stability than the commercially available vertical cameras which have been state of the art for the industry. Moreover, this invention conveniently provides the capability of handling very large format film sizes of the order of 16"×20", 20"×24" or larger. Ordinary vertical cameras could not handle these formats in a room with eight foot ceilings. Moreover, one person could not focus the image since to do so, he would have to be up on a tall stepladder to see the image closely and thus would be out of reach of the micrscope focussing knob which would have to be on the floor. Since the image falls onto the photographic material immediately beside the microscope 10, it is very easy for the worker to achieve critical focus by looking directly at the projected image while his hand controls the focus 14 and 16 and mechanical stage translation knobs 1 3 of his microscope 10.

None of the many possible embodiments obviate the basic concept and purpose of this invention, namely the use of a folded optical system employing flat mirrors, or prism and flat mirror combinations to deviate the light beam emanating from a microscope in such a manner that it propagates vertically downward to the film plane. This enables the forces of gravity to work for the large format camera rather than against it. The film holder is rigidly held in place on the supporting base rather than vibrating and creeping downward and the film or paper material is flattened out rather than bulging downward and trying to fall out of the easel or film holder. Also the folding of the light beam allows a very compact camera to produce images of vastly greater sizes than could be accomplished with devices based upon the art and invention of Flint et al.

As explained in detail above, the preferred embodiment of this invention can be modified slightly so that it may be used to produce microphotographs, microdots, or microscopic images on photoresist material to produce microelectronic components. To do so, the optical path through the device is reversed. The item to be photographed is placed in the position of film holder 36 (FIG. 2) and illuminuated by a light table or other external light source. Microscope slide 15 is replaced by a high resolution photographic plate with its emulsion side upward. After sharply focussing the image with the objective, the image is recorded by the shutter. Thus, the device may be utilized as a simple and highly effective method and apparatus for producing microdots or microelectronic circuits.

What is claimed is:

1. A photomicrographic camera system comprising:
   a microscope having an objective and an eyepiece;
   a camera housing comprising:
      a main body, said main body comprising an enclosure having a flat base,
      a horizontal arm section connected to the top side of said main body and extending laterally therefrom,
      a vertical neck section attached to said horizontal arm section and suspended over said microscope and covering said microscope eyepiece;
   a primary mirror located in the junction of said neck section and said arm section, directly above said microscope, said mirror being oriented at substantially a 45° angle with respect to the vertical, said mirror being arranged to be able to receive a vertically ascending and diverging light beam emanating from said eyepiece of said microscope and deflect it horizontally along the long axis of said arm;
   a secondary mirror located in the top of said camera housing main body, said mirror being oriented at substantially a 45° angle with respect to the vertical, so as to receive said light beam from said primary mirror and deflect it downward;
   a shutter arranged to interrupt said light beam;
   a film holder resting on said base of said camera housing main body below said secondary mirror and positioned to receive an image carried by said light beam;
   a film mounted in said film holder.

2. The photomicrographic camera system of claim 1 comprising a common base for said camera housing and said microscope, said camera housing and said microscope both resting on said common base.

3. The photomicrographic camera system of claim 2 comprising a support for said common base and means for vibrationally isolating said common base from said support.

4. The photomicrographic camera system of claim 1 wherein said camera neck comprises a telescoping section whereby the vertical length of said camera neck may be adjusted to accommodate microscopes of different heights and to facilitate interchange of eyepieces and spacers.

5. The photomicrographic camera system of claim 1 wherein said camera arm comprises a telescoping section.

6. The photomicrographic camera system of claim 1 comprising means for moving said camera housing toward or away from said microscope in order to make slight alterations in image size or magnification without altering the microscope objective and eyepiece combination in use.

7. The photomicrographic camera system of claim 1 wherein said shutter is mounted in said camera neck.

8. The photomicrographic camera system of claim 7 comprising a cable release attached to said shutter.

9. The photomicrographic camera system of claim 1 comprising a filter tray mounted in said camera neck, said filter tray being arranged to be withdrawn for insertion of filters.

10. The photomicrographic camera system of claim 1 comprising a rotatable polarizer mounted in said camera neck, said rotatable polarizer being arranged to be withdrawn from said camera neck.

11. The photomicrographic camera system of claim 1 comprising a baffle system mounted in said camera neck for eliminating stray light.

12. The photomicrographic camera system of claim 1 comprising a port containing a correcting positive lens mounted in said camera neck and a reflecting means mounted in said camera neck to deflect said light beam horizontally toward said port, the outside portion of said port comprising a mount for attaching a camera apparatus.

13. A photomicrographic camera system of claim 1 comprising a tertiary mirror mounted in said camera arm, said tertiary mirror having two fixed positions and being arranged to pivot into said light beam from said primary mirror or to pivot out of said light beam, said primary mirror having two fixed positions and being arranged to deflect said light beam to either said secondary mirror or to said tertiary mirror, whereby said photomicrographic camera system utilizing said tertiary mirror has an uneven number of reflections and thus is capable of making a photograph with correct left to right orientation with certain types of photographic paper or film materials.

14. The photomicrographic camera system of claim 1 wherein said secondary mirror is arranged to be pivoted out of said light beam and said camera system comprises a translucent screen mounted in the vertical wall of said camera housing main body to receive the image carried by said light beam, whereby said image may be sharply focussed on said screen.

15. The photomicrographic camera system of claim 14 comprising a film holder mounted on the inside wall of said camera housing main body whereby a film may be slid into said film holder after said image is focussed.

16. The photomicrographic camera system of claim 1 comprising a sliding dust cover attached to said secondary mirror to protect said mirror from dust and contaminants when it is not in use.

17. The photomicrographic camera system of claim 1 wherein said film holder comprises a focus sheet mounted on top of said film and wherein said film holder is rigidly mounted to the base of said housing main body and comprising viewing port means in the side of the camera housing main body for viewing said focus sheet of said film holder and means for extracting said focus sheet for exposure and said film after exposure has been completed.

18. The photomicrographic camera system of claim 1 comprising a light meter and a partially transmitting beamsplitter mounted in said camera neck whereby a portion of said light beam may be diverted by said beamsplitter to said light meter for automatic readout and control of the required exposure time.

19. A photomicrographic camera system comprising:
a microscope having an objective and an eyepiece;
a vertically ascending and diverging light beam emerging from said microscope eyepiece;
a microscope housing enclosing said microscope, said housing having a port in its top to allow passage of said light beam out of said microscope housing;
a camera housing for enclosing said camera system, said camera housing comprising a flat base at the bottom of said camera housing, said microscope housing resting on said base of said camera housing and said microscope housing being completely enclosed by said camera housing;
a primary mirror mounted on one side of the top of said camera housing directly above said microscope housing, said mirror being oriented at substantially a 45° angle with respect to the vertical, said mirror being arranged to be able to receive said light beam from said objective and deflect it horizontally;
a secondary mirror located on the opposite side of the top of said camera housing, said mirror being oriented at substantially a 45° angle with respect to the vertical, so as to receive said light beam from said primary mirror and deflect it downward;
a shutter arranged to interrupt said light beam;
a film holder resting on the base of said camera housing below said secondary mirror and positioned to receive an image carried by said light beam; and
a film mounted in said film holder.

20. The photomicrographic camera system of claim 13 comprising a common base for said camera housing and said microscope, said camera housing and said microscope both resting on said camera base.

21. The photomicrographic camera system of claim 20 comprising a support for said common base and means for vibrationally isolating said common base from said support.

22. The photomicrographic camera system of claim 21 wherein said shutter is mounted in said camera neck.

23. The photomicrographic camera system of claim 22 comprising a cable release attached to said shutter.

24. The photomicrographic camera system of claim 23 comprising a filter tray mounted in said camera neck, said filter tray being arranged to be withdrawn for insertion of filters.

25. The photomicrographic camera system of claim 24 comprising a rotatable polarizer mounted in said camera neck, said rotatable polarizer being arranged to be withdrawn from said camera neck.

26. The photomicrographic camera system of claim 25 comprising a baffle system mounted in said camera neck for eliminating stray light.

27. The photomicrographic camera system of claim 26 wherein said camera neck comprises a telescoping section whereby the vertical length of said camera neck may be adjusted to accommodate microscopes of different heights and to facilitate interchange of eyepieces and spacers.

28. The photomicrographic camera system of claim 27 wherein said camera arm comprises a telescoping section.

29. The photomicrographic camera system of claim 28 comprising means for moving said camera housing toward or away from said microscope in order to make slight alterations in image size or magnification without altering the microscope objective and eyepiece combination in use.

30. The photographic camera system of claim 29 comprising a sliding dust cover attached to said secondary mirror to protect said mirror from dust and contaminants when it is not in use.

31. The photomicrographic camera system of claim 30 wherein said film holder comprises a focus sheet mounted on top of said film and wherein said film holder is rigidly mounted to the base of said housing main body and comprising viewing port means in the side of the camera housing main body for viewing said focus sheet of said film holder and means for extracting said focus sheet for exposure and said film after exposure has been completed.

32. The photomicrographic camera system of claim 31 comprising a light meter and a partially transmitting beamsplitter mounted in said camera neck whereby a portion of said light beam may be diverted by said beam splitter to said light meter for automatic readout and control of the required exposure time.

33. A photomicrographic camera system for producing microphotographs from original copies comprising:
a microscope having an objective, an eyepiece, and a mechanical stage;
a camera housing comprising:
a main body, said main body comprising an enclosure having a flat base,
a horizontal arm section connected to the top side of said main body and extending laterally therefrom,
a vertical neck section attached to said horizontal arm section and suspended over said microscope and covering said microscope eyepiece;
a holder for an original copy resting on said base of said camera housing main body;
a secondary mirror attached to the top of said camera housing main body, said mirror being oriented at substantially a 45° angle with respect to the vertical and positioned above said original copy holder, so as to receive a light beam from said original copy and deflect it through said horizontal arm section;
a primary mirror located in the junction of said neck section and said arm section, said mirror being oriented at substantially a 45° angle with respect to the vertical, said mirror being arranged to receive said light beam from said secondary mirror and deflect it vertically down to the eyepiece of said microscope;
a shutter arranged to interrupt said light beam;
an extended internal light source for illuminating said original copy;
a high resolution photographic plate mounted on said microscope mechanical stage, for receiving and recording an image from said original copy.

34. The photomicrographic camera system of claim 12 comprising a camera adapter tube, one end of said tube being attached to said mount which is part of said port and the opposite end of said tube having a mount for attaching a camera.

35. The photomicrographic camera system of claim 34 wherein said mount on said opposite end of said tube is configured for attaching a small format camera.

36. The photomicrographic camera system of claim 34 wherein said mount on said opposite end of said tube is configured for attaching a video camera.

* * * * *